United States Patent [19]

Mashita et al.

[11] Patent Number: 5,350,610
[45] Date of Patent: Sep. 27, 1994

[54] DAMPING MATERIAL

[75] Inventors: Naruhiko Mashita; Akihiko Ogino; Yoshihide Fukahori, all of Tokyo, Japan

[73] Assignee: Bridgestone Corporation, Tokyo, Japan

[21] Appl. No.: 997,140

[22] Filed: Dec. 22, 1992

Related U.S. Application Data

[63] Continuation of Ser. No. 719,016, Jun. 21, 1991, abandoned.

[30] Foreign Application Priority Data

Jul. 2, 1990 [JP] Japan ................... 2-175124

[51] Int. Cl.$^5$ ............................................. B29D 22/00
[52] U.S. Cl. ................................. 428/35.7; 524/66; 524/68; 527/500; 527/501; 527/503

[58] Field of Search .............. 527/500, 501, 503; 524/66, 68; 428/458, 460, 462, 35.7

[56] References Cited

U.S. PATENT DOCUMENTS

| | | | |
|---|---|---|---|
| 4,835,199 | 5/1989 | Futamura et al. | 524/66 |
| 4,883,717 | 11/1989 | Kitamura et al. | 428/458 |
| 4,973,615 | 11/1990 | Futamura et al. | 524/66 |

*Primary Examiner*—John Kight, III
*Assistant Examiner*—Richard Jones
*Attorney, Agent, or Firm*—Kanesaka & Takeuchi

[57] ABSTRACT

Disclosed is a damping material, which contains from 3 to 30% by weight of a thermoplastic elastomer containing at least two polymer blocks along with a bitumen and which has a dynamic loss tangent (tan δ) of being 0.5 or more in 10% deformation under the condition of 25° C. and 1 Hz.

3 Claims, 6 Drawing Sheets

DAMPING MATERIAL

This application is a continuation of application Ser. No. 719,016, filed Jun. 21, 1991 now abandoned.

FIELD OF THE INVENTION AND RELATED ART STATEMENT

The present invention relates to a damping material having a damping function of absorbing a vibration or quake energy ("vibration" and "quake" being hereinafter simply referred to as "vibration") to be transmitted to various instruments, structures and others to be vibrated; and in particular, it relates to a damping material which can be applied to various industrial appliances and structures of all industrial and technical fields, such as buildings, vehicles and OA instruments, as well as to various sports goods, to thereby display an extremely excellent damping effect.

Various damping devices have heretofore been known, which may damp the vibration of instruments or structures to be caused by an earthquake or the like. Such damping devices may absorb a vibration energy because of the energy-absorbing capacity of the elements of constituting the devices. Conventional damping devices can be grouped into two groups; and one utilizes the plastic effect of lead and other metals, and the other utilizes the viscous effect of oil and others.

In the conventional damping devices, the former of utilizing the plastic effect has a problem that it could not almost display the damping effect in the range of a small deformation since such a small deformation is often an elastic one.

On the other hand, the latter of utilizing the viscous effect of oil and others also has various problems. Precisely, in order to attain a large damping effect, the device is to be large-sized, and additionally, handling of oil is troublesome and shaping of such oily damper products is difficult. Moreover, it has still another drawback that operation for maintenance of the damping devices of themselves for a long period of time is complicated and not easy.

OBJECT AND SUMMARY OF THE INVENTION

The object of the present invention is to overcome the above-mentioned problems in the prior art and to provide a damping material capable of constructing an ideal damping device having the following advantages:

(1) The material of constructing the damping device has a possibly greatest damping effect.
(2) The device has a structure capable of displaying the damping effect of the material to the greatest limit.
(3) The material may easily be shaped and worked.
(4) The material may easily be handled.
(5) Because of the advantages of (1) to (4), the cost of manufacturing the damping device may noticeably be lowered.

In order to satisfy the object, there is provided in accordance with the present invention a damping material, which contains from 3 to 30% by weight of a thermoplastic elastomer containing at least two polymer blocks along with a bitumen and which has a dynamic loss tangent (tan $\delta$) of 0.5 or more in 10% deformation under the condition of 25° C. and 1 Hz.

Specifically, the damping material of the present invention has an extremely excellent damping characteristic and is extremely industrially useful as one for various damping devices.

The technical field of using the damping material of the present invention is extremely broad and it is not specifically defined. In particular, the damping material of the present invention is especially effective in the following industrial fields.

Precisely, the damping material of the present invention is advantageously applied to a construction field for the purpose of damping of vibrations of high buildings, of prevention of quakes of middle buildings and low buildings, and of damping of floor vibrations and traffic vibrations; and in particular, there is mentioned a brace damping construction method for damping the vibrations of the above-mentioned high buildings. Additionally, the material may also be used for damping vibrations of vehicles such as cars, trains, airplanes and bicycles. Further, it is also effectively applicable to precision instruments, clean rooms, biotechnological factories and IC factories which are apt to be easily damaged by fine vibrations. In addition, it is also effective for damping of vibrations of ordinary 0A appliances, industrial appliances, electric appliances and sound appliances. Further, it may also display an excellent damping effect to various sports goods such as shoes, rackets, golf clubs and skis and is therefore extremely useful in such goods.

DESCRIPTION OF THE PREFERRED EMBODIMENTS

Figure 1:
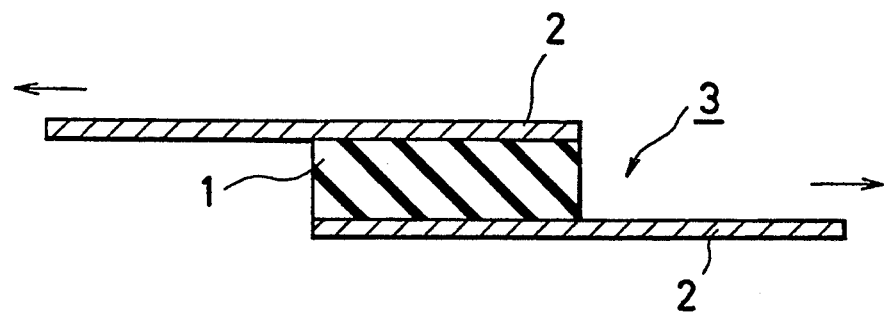
FIG. 1 is a cross-sectional view of showing a damping unit having a damping material of the present invention.

The thermoplastic elastomer to be employed in the present invention is preferably one containing at least the following polymer blocks I and II.

I : A crystalline polymer block having Tm (melting point) of higher than 40° C.
II : An amorphous polymer block having Tg (glass transition temperature) of 0° C. or lower.

Regarding the proportion of the above-mentioned polymer blocks I and II in the thermoplastic elastomer, it is desired that the weight ratio of the crystalline polymer block I to the amorphous polymer block II (I/II) falls within the range of from 10/90 to 80/20.

The crystalline polymer block U of constituting the thermoplastic elastomer is desired to have Tm of falling within the range between 60° C. and 165° C. The amorphus polymer block II is desired to have Tg of falling within the range between −15° C. and −100° C. The weight ratio of the crystalline polymer block I to the amorphous polymer block II (I/II) is desired to fall within the range between 15/85 and 60/40. Especially preferably, the crystalline polymer block I of constituting the thermoplastic elastomer has Tm of falling within the range between 70° C. and 140° C. Also especially preferably, the amorphous polymer block II has Tg of falling within the range between −20° C. and −100° C. Still especially preferably, the weight ratio of the crystalline polymer block I to the amorphous polymer block II (I/II) falls within the range between 25/75 and 50/50.

In the present invention, any and every thermoplastic elastomer which satisfies the above-mentioned conditions can be employed. Specifically, it is desired that the crystalline polymer block of constituting the thermoplastic elastomer is a hydrogenated polybutadiene block and that the amorphous polymer block is a hydrogenated block of an irregular copolymer composed of vinyl allene (e.g., styrene) and 1,3-butdiene.

It is desired that the crystalline polymer block is composed of only a hydrogenated polybutadiene block, but it may contain a small amount (for example, 20% by weight or less) of 1,3-butadiene provided that it has the above-defined characteristics.

As the amorphous polymer block, any other amorphous polymer block than the hydrogenated irregular copolymer block may also be used. For instance, various amorphous polymer blocks are usable, such as hydrogenated blocks of polybutadiene, hydrogenated blocks of polyisoprene or hydrogenated blocks of isoprene/butadiene having from 35 to 95% by weight of 1,2-fine structure before hydrogenation.

The thermoplastic elastomer for use in the present invention can contain any other polymer blocks, in addition to the above-mentioned crystalline polymer block and amorphous polymer block, provided that the additional polymer blocks do not have any bad influence on the necessary characteristics of the thermoplastic elastomer.

An especially preferred thermoplastic elastomer for use in the present invention is a hydrogenated two-block copolymer composed of the following two hydrogenated blocks (1) and (2).

(1) A hydrogenated block of polybutadiene containing 1,2-fine structure in a proportion less than 30% before hydrogenation.
(2) A hydrogenated block of an irregular copolymer containing from 5 to 50% by weight of vinyl allene (e.g., styrene) and from 50 to 95% by weight of butadiene (containing from 5 to 80% of 1,2-fine structure before hydrogenation).

It is desired that the proportion of the block (1) is from 20 to 70% by weight and that of the block (2) is from 80 to 30% by weight.

It is desired that the hydrogenated two-block copolymer has a mean molecular weight of from 15,000 to 1,000,000, especially preferably from 20,000 to 500,000, as determined by measurement of the viscosity.

It is also desired that the two-block copolymer has an unsaturation degree of 20% or less, especially preferably 10% or less, to that of the original non-hydrogenated one.

Such a hydrogenated two-block copolymer can be prepared by first producing a non-hydrogenated two-block copolymer by means of a known block polymerization method and thereafter hydrogenating it by means of a known hydrogenation method using a known hydrogenating catalyst.

A bitumen composition is used in the present invention, which consists essentially of the above-mentioned thermoplastic elastomer and a bitumen. The bitumen to be employed in the present invention includes, for example, a natural bitumen, a synthetic bitumen to be obtained under heat, and a mixture of hydrocarbons to be derived from combination of the former two. The bitumen may contain non-metallic derivatives.

In general, a bitumen is gaseous, liquid, semi-solid or solid, and it is generally soluble in hydrogen disulfide. In the present invention, a liquid, semi-solid or solid bitumen can be used. As industrial examples of bitumens, in general, there are mentioned asphalts, tars and pitches. Preferred examples of bitumen materials for use in the present invention are mentioned below.

(1) Asphalts:
  (a) Petroleum asphalts:
    (i) Straight reduction asphalts (obtained by normal pressure or reduced pressure reduction, or by precipitation with propane or the like solvent).
    (ii) Heat asphalts, such as residue from cracking operation of petroleum materials.
    (iii) Air blown asphalts (straight blown or catalyst blown asphalt).
  (b) Natural asphalts:
    (i) Asphalts having a mineral content of not more than 5% by weight (asphaltites such as gilsonite, graphamite and glance pitch; as well as natural precipitates from Bermudes Lake and other natural precipitates).
    (ii) Asphalts having a mineral content of not less than 5% by weight (rock asphalt; as well as natural precipitates from Trinidad and other natural precipitates).
(2) Tars and Their Derivatives:
  (a) Coal tar residues from coke furnaces:
    (i) Coal tars as reduced to a float degree, such as those of an RT (road tar) degree for pavement.
    (ii) Coal tar pitches as reduced to a softening point degree.
  (b) Dry distillation residues from aqueous gas, wood, peat, bone, paigeite, rosin or fatty acid tar.

In the present invention, petroleum asphalts and natural asphalts are especially preferred from among the above-mentioned examples, and petroleum asphalts are most preferred. In petroleum asphalts, most preferred are heat asphalts.

The bitumen material may be blended with the thermoplastic elastomer to prepare a damping material of the present invention, in accordance with any known method of blending an asphalt material and various rubbers. As one preferred embodiment of blending the thermoplastic elastomer and the bitumen material employable in the present invention, there is mentioned a method of using a high shear mixing device in which a thermoplastic elastomer is incorporated into a pre-heated bitumen material with stirring whereupon the thermoplastic elastomer is pulverized into fine grains and dispersed in the high-temperature bitumen material.

In carrying out the present invention, the above-mentioned thermoplastic elastomer and bitumen material may be used singly or as a mixture of two or more kinds of them.

In the bitumen composition of the present invention, the proportion by weight of the above-mentioned thermoplastic elastomer to the total of the material and the above-mentioned bitumen material is from 3 to 30% by weight, more preferably from 5 to 20% by weight. If the proportion is less than 3% by weight, the intended effect could not be attained; but if it is more than 30% by weight, the composition would be unfavorably a rubber-like one.

The bitumen composition of the present invention can further contain, in addition to the thermoplastic elastomer and bitumen material, other ordinary additives such as various fillers, tackifiers, lubricants, antioxidants, plasticizers, softening agents, low molecular polymers and oils, if desired, whereby the resulting damping material may have intended hardness, damping characteristic and durability. In particular, for the purpose of maintaining the determined characteristics especially for a long period of time, it is effective to add pertinent stabilizers such as an antioxidant, polymerization inhibitor or scorching inhibitor to the above-mentioned bitumen composition.

Preferred examples of usable additives are mentioned below.

(a) Fillers: Flaky inorganic fillers of clay, diatomaceous earth, carbon black, silica, talc, barium sulfate, calcium carbonate, magnesium carbonate, metal oxides, mica, graphite, and aluminium hydroxide; granular or powdery solid fillers of various metal powder, wood chips, glass powder, ceramic powder, and granular or powdery polymers; and other fillers for rubbers or resins, such as various natural or synthetic short fibers or long fibers (for example, straws, hairs, glass fibers, metal fibers and other various polymer fibers). Additionally, hollow or porous grains are also suitable.

(b) Softening Agents: Various aromatic, naphtenic or paraffinic softening agents for rubbers or resins.

(c) Plasticizers: Various ester plasticizers such as phthalates, mixed phthalates, aliphatic dibasic acid esters, glycolic esters, fatty acid esters, phosphates, and stearates; epoxy plasticizers and other plasticizers for plastics; as well as plasticizers for NBR such as phthalates, adipates, sebacates, phosphates, polyethers, and polyesters.

(d) Tackifiers: Various tackifiers such as chroman resins, chroman-indene resins, phenol-terpene resins, petroleum hydrocarbons, and rosin derivatives.

(e) Oligomers: Various oligomers such as crown ether, fluorine-containing oligomers, polybutene, xylene resins, chlorinated rubbers, polyethylene wax, petroleum resins, rosin ester rubber, polyalkylene glycol diacrylates, liquid rubbers (e.g., polybutadiene, styrene-butadiene rubber, butadiene-acrylonitrile rubber, polychloroprene), silicone oligomers, and poly-α-olefins.

(f) Lubricants: Hydrocarbon lubricants such as paraffin and wax; fatty acid lubricants such as higher fatty acids and hydroxy-fatty acids; fatty acid amide lubricants such as fatty acid amides and alkylene-bis-fatty acid amides; ester lubricants such as lower alcohol esters of fatty acids, polyalcohol esters of fatty acids and polyglycol esters of fatty acids; alcohol lubricants such as aliphatic alcohols, polyalcohols, polyglycols and polyglycerols; and other various lubricants such as metal soap and mixed lubricants.

In addition to the above-mentioned additives, addition of a vulcanized rubber, finely pulverized vulcanized rubber, latex, emulsion or liquid rubber is also effective. Further, a foaming agent may also be advantageously added so as to lighten the weight of the resulting damping material. Additionally, a crosslinking agent such as sulfur or peroxides may also be effectively added so as to improve the durability of the same.

Next, the physical properties and characteristics of the damping material of the present invention, which comprises the above-mentioned bitumen composition, will be explained in detail hereunder.

First, the damping material of the present invention is indispensable to have a high energy-absorbing potency (damping capacity), and as an index for satisfying the condition, the material is to have a dynamic loss tangent (tan $\delta$) of being 0.5 or more, preferably 0.6 or more, more preferably 0.7 or more, in 10% deformation under the condition of 25° C. and 1 Hz.

On the other hand, such a damping material is said necessary to be deformed in accordance with the motion of the vibrating body, and accordingly, it is desired that the material has a static breaking elongation of 50% or more, especially 100% or more, particularly preferably 200% or more, under the condition of 25° C. and 200 mm/min.

Next, the present invention will be explained in more detail by way of the following examples, which, however, are not intended to restrict the scope of the present invention.

EXAMPLES 1 TO 3

Various bitumen compositions each comprising the components shown in Table 1 below were prepared, and the dynamic loss tangent (tan $\delta$) in 10% deformation under the condition of 25° C. and 1 Hz and the static breaking elongation (Eb) under the condition of 25° C. and 200 mm/min of damping materials obtained from these compositions were measured. The results obtained are shown in Table 1.

From the data in Table 1, it is obvious that the damping materials made of the bitumen compositions of the present invention have excellent damping characteristics.

TABLE 1

| Example | 1 | 2 | 3 |
|---|---|---|---|
| Bitumen Composition (wt. %) | | | |
| Thermoplastic Elastomer(*) | 8 | 12 | 16 |
| Straight Asphalt | 92 | 88 | 84 |
| tan $\delta$ | 1.10 | 1.0 | 0.85 |
| Eb (%) | 900 | 760 | 700 |

(*)Styrene-butadiene-styrene block copolymer with butadiene moiety being hydrogenated.

Next, embodiments of damping devices made from the damping material of the present invention will be explained below, with reference to the drawings attached hereto.

The damping material of the present invention can be used as an ordinary damping material, for example, by attaching or inserting it by itself to or into a vibrating body.

Alternatively, it may also be used as a device where the damping material is sandwiched between hard materials. In various means, the most simple one is to use the material as a bound damping material or damping steel sheet. More effectively and efficiently, the damping material of the present invention is sandwiched between hard materials so as to utilize the energy-absorbing potency of the structure in the shearing deformation of the same.

Figure 2:
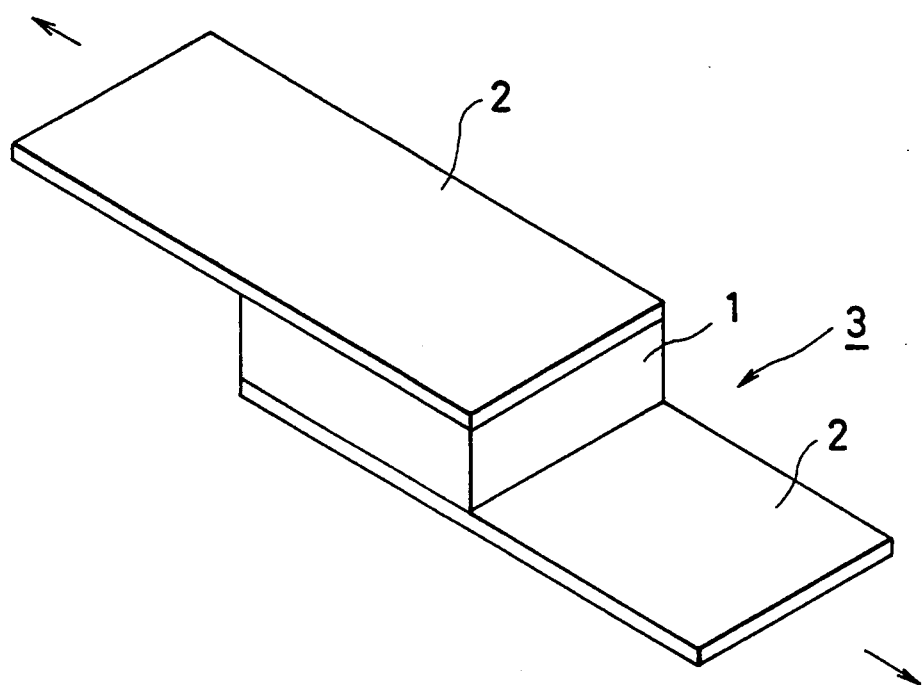
FIG. 2 is a perspective view of FIG. 1.
Figure 3:
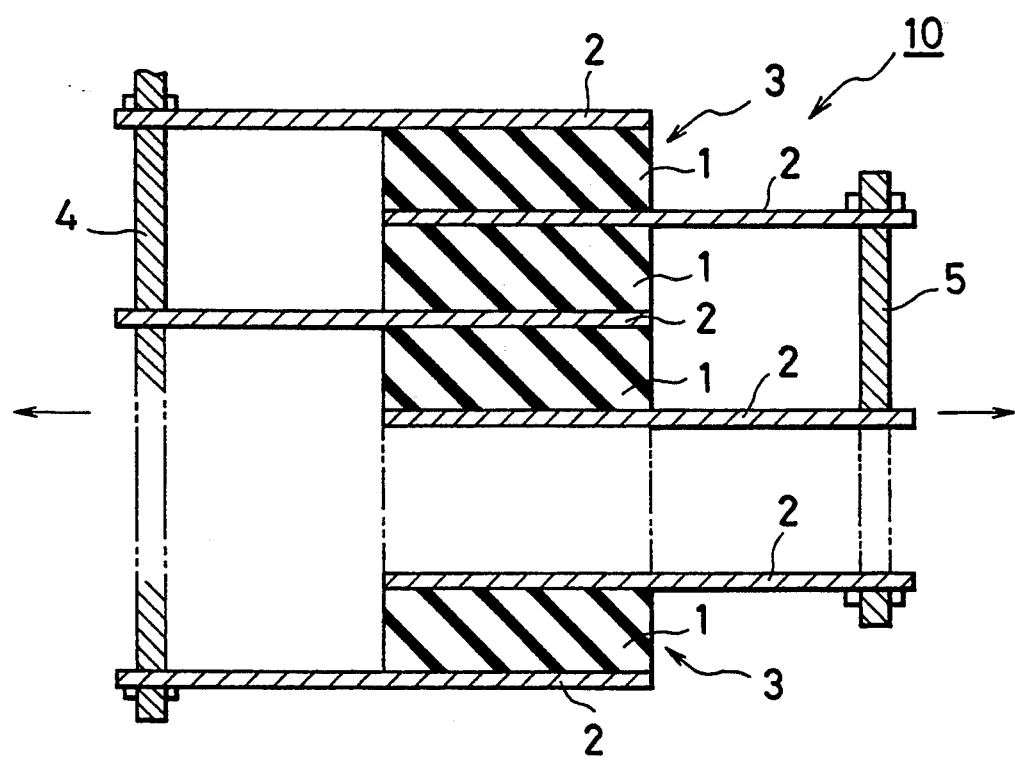
FIG. 3 is a cross-sectional view of showing one embodiment of a damping device having a damping material of the present invention.

FIG. 1 is a cross-sectional view of showing a basical unit of one embodiment of the case, and FIG. 2 is a perspective view of the same unit. FIG. 3 is a cross-sectional view of showing a damping device composed of a plurality of the units of FIG. 1 as piled up. In these drawings, (1) is a damping material, and (2) is a sheet of a hard material. The damping device (10) of FIG. 3 is composed of a plurality of damping units (3) of FIG. 1 in which the damping material (1) has been sandwiched between the hard sheets (2), and the damping units are fixed with supporting parts (4) and (5). (In FIG. 1 to FIG. 3, the arrows indicate the vibrating directions.)

Figure 4:
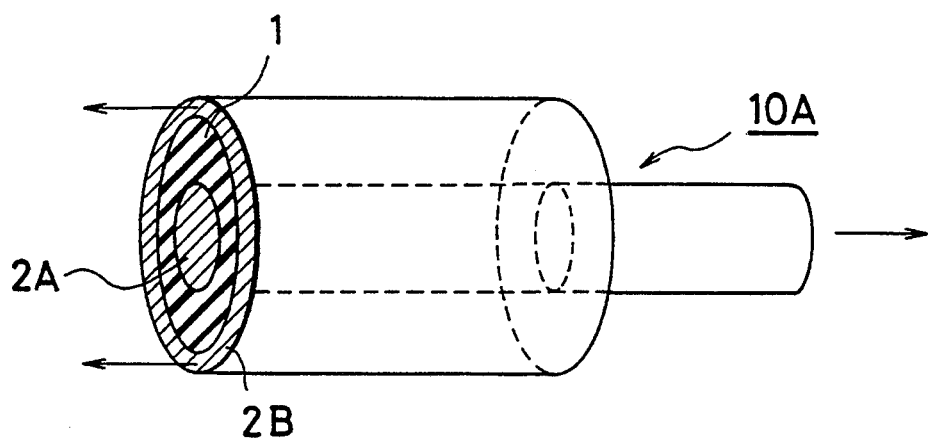
FIG. 4, FIG. 5, FIG. 6 and FIG. 7 are perspective cross-sectional views of showing other embodiments of damping devices each having a damping material of the present invention.
Figure 5:
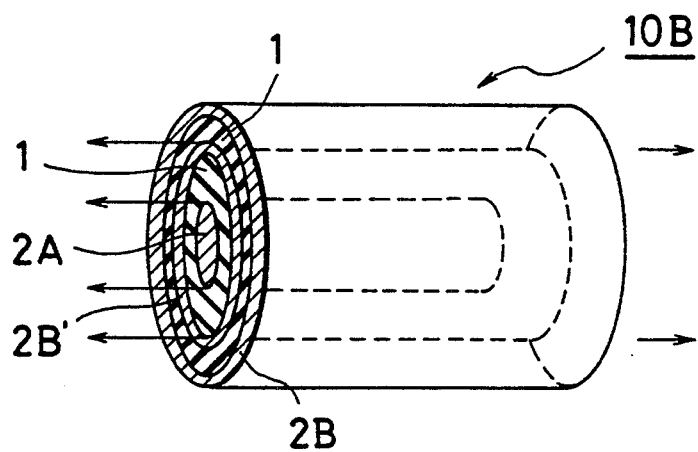
Figure 6:
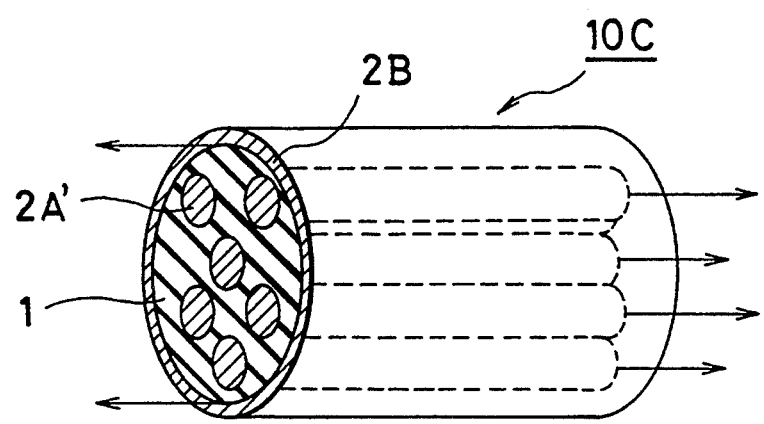
Figure 7:
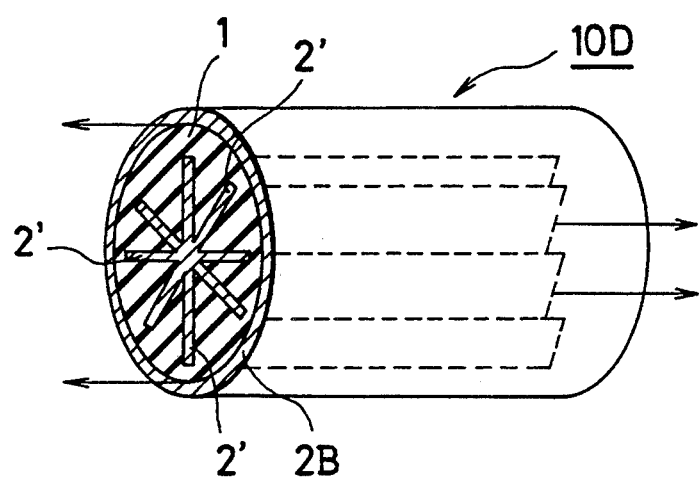

In the embodiments of FIG. 1 to FIG. 3, hard sheets (2) are used but these are not limitative. Precisely, the form of the hard material is not limited to only a sheet form but any other cylindrical form or the like as well as a combination of sheet and cylindrical forms may also be employed. For instance, FIG. 4 to FIG. 7 show perspective cross-sectional views of other embodiments of different damping devices where hard materials of other various forms have been used. The damping device (10A) of FIG. 4 is composed of a columnar hard material (2A) and a cylindrical hard material (2B), the former being concentrically inserted into the latter, and a damping material (1) of the invention is filled into the space between the materials (2A) and (2B). The damping device (10B) of FIG. 5 is composed of a columnar hard material (2A) and cylindrical hard materials (2B') and (2B), the former (2A) being concentrically inserted into the latter (2B') and (2B) in order, and a damping material (1) of the invention is filled into the space between the hard materials (2A) and (2B') and also into the space between the hard materials (2B') and (2B). The damping device (10C) of FIG. 6 is composed of a plurality of columnar hard materials (2A') and a cylindrical hard material (2B), the former being uniformly inserted into the latter, and a damping material (1) of the invention is filled into the space between the hard materials (2B) and (2A'). The damping device (10D) of FIG. 7 is composed of a plurality of hard sheets (2') and a cylindrical hard material (2B), the former being radially inserted into the latter, and a damping material (1) of the invention is filled into the space between the hard materials (2') and (2B).

Figure 8:
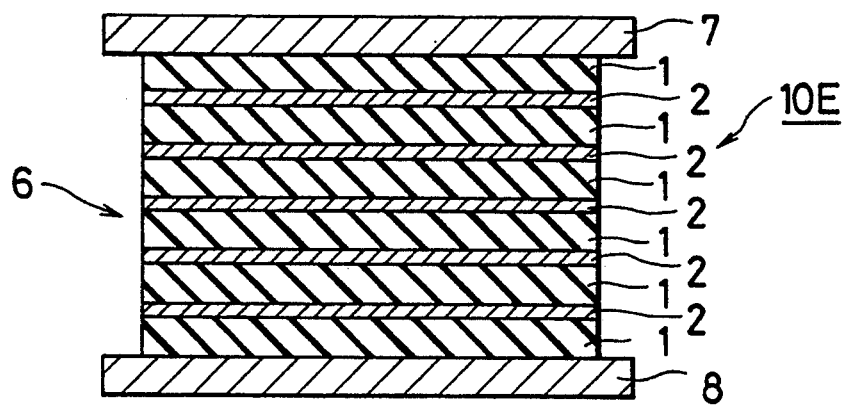
FIG. 8 and FIG. 9 are cross-sectional views of showing still other embodiments of damping devices each having a damping material of the present invention.

As still another embodiment of application of the damping material (1) of the present invention, there is mentioned a damping device (10E) of FIG. 8 in which a plurality of damping material sheets (1) and a plurality of hard material sheets (2) are laminated alternately to each other to give a laminate structure (6) and the laminate structure (6) is fixed between flanges (7) and (8).

Figure 9:
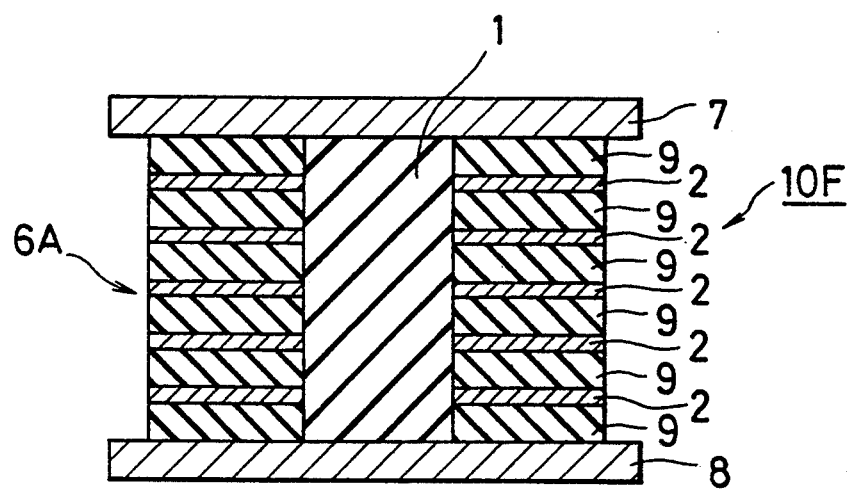

As still another embodiment of application of the damping material (1) of the present invention, there is further mentioned a damping device (10F) of FIG. 9 in which the center part of a laminate structure (6A) composed of a plurality of hard material sheets (2) and a plurality of general rubber sheets (9) is hollowed out, a damping material (1) of the present invention is filled into the hollowed part, and the resulting structure is fixed between flanges (7) and (8).

As one interest damping construction means, which has recently received much attention by those skilled in the art, there is mentioned a so-called brace damping construction means. In accordance with the means, precisely, a damping material capable of displaying a damping effect by shear deformation of the same is combined with a brace to be provided in the wall materials or flooring material of every floor of buildings, especially high buildings, whereby the vibration of quake of the buildings is damped. The damping material of the present invention is extremely effectively used in such a brace damping construction means.

Figure 10:
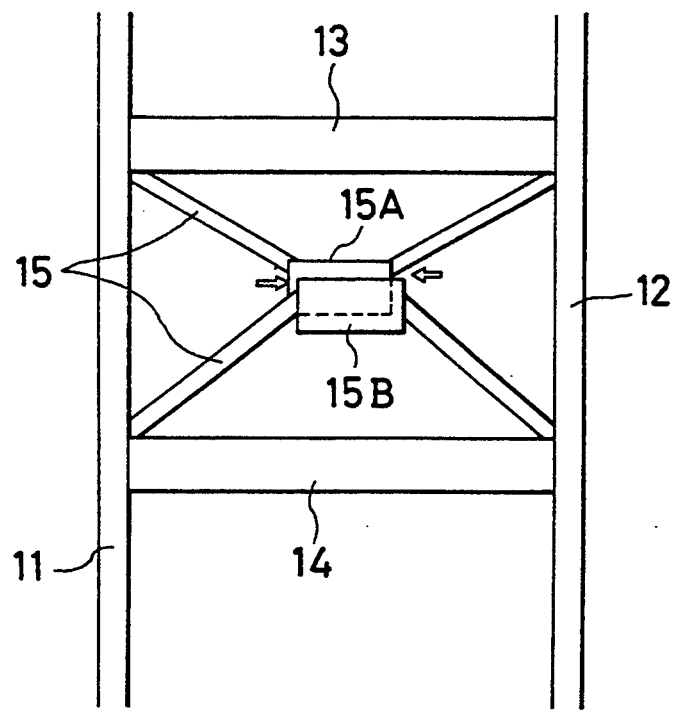
FIG. 10 is an explanatory view of showing a brace damping construction means.

FIG. 10 shows one embodiment of such a brace damping construction means, in which (11) and (12) are pillars, (13) and (14) are beams, and (15) is a brace. As is shown in FIG. 10, a brace (15) is provided between the pillars (11), (12) and the beams (13), (14) in such a way that some space is provided between the Upper brace part and the lower brace part, or precisely, a space is formed between the sheet parts (15A) and (15B) (as indicated by an arrow), and a damping material of the present invention (not shown) is inserted into the space. Where the building having such a structure is vibrated or quaked, the upper beam (13) and the lower beam (14) of each floor are to have a relative displacement to cause a relative movement between the sheet part (15A) and the sheet part (15B). As a result, the damping material as inserted into the space between the parts (15A) and (15B) is to receive repeated deformation. Accordingly, since a damping material having a larger damping effect could display an effect of decreasing the vibration or quake of the building, the damping material of the present invention is extremely preferably and advantageously used for the purpose.

Needless to say, the damping devices as shown in FIG. 1 to FIG. 10 are mere embodiments to which the damping material of the present invention is applicable, and these do not whatsoever restrict the scope of the present invention. The damping material of the present invention is not limited to the illustrated embodiments but may effectively be applied to any and every damping device which theoretically utilizes the energy-absorbing potency of the material in shear deformation thereof.

The hard materials usable in the damping devices are not specifically limited but include, for example, metals, ceramics, glass, FRP, plastics, polyurethanes, high rigid rubber, wood, rocks, paper and leathers.

Where a damping device composed of a damping material of the present invention and the above-mentioned hard material is manufactured, any known method may be employed. For instance, there are mentioned a method of sticking a damping material and a hard material to each other, and a method of cementing a damping material and a hard material as attached to each other, under heat. Preferably, an injection molding method of utilizing the high fluidity of the damping material of the present invention at a high temperature is desirably employed.

While the invention has been described in detail and with reference to specific embodiments thereof, it will be apparent to one skilled in the art that various changes and modifications can be made therein without departing from the spirit and scope thereof.

What is claimed is:

1. A damping device, comprising:
   a damping material including a bitumen, and 3-30% by weight of a thermoplastic elastomer containing a crystalline polymer block having melting point of higher than 40° C. and an amorphous polymer block having glass transition temperature of 0° C. or lower, ratio of said crystalline polymer block to said amorphous polymer block being 10:90 to 80:20, said damping material having a dynamic loss tangent of 0.5 to 1.5 in 10% deformation under a condition of 25° C. and 1 Hz and a static breaking elongation of from 50 to 1500% under a condition of 25° C. and 200 mm/min, and
   at least one hard material having one portion firmly attached to the damping material and the other portion attached to a supporting part, said damping material damping vibration transferred through the hard material, wherein said hard material is formed of at least one hollow member and at least one columnar hard materials situated in the hollow member, said damping material being filled in a space in the hollow member to damp vibration applied to one of the hollow member and the columnar hard material.

2. The damping device as claimed in claim 1, wherein said hard material includes a plurality of columnar hard materials situated in the hollow member.

3. A method of using a material for reducing vibration, comprising:

preparing a damping material including bitumen, and 3–30% by weight of a thermoplastic elastomer containing a crystalline polymer block having melting point of higher than 40° C. and an amorphous polymer block having glass transition temperature 0° C. or lower, ratio of said crystalline polymer block to said amorphous polymer block being 10:90 to 80:20, said material having a dynamic loss tangent of 0.5 to 1.5 in 10% deformation under a condition of 25° C. and 1 Hz and a static breaking elongation of from 50 to 1500% under a condition of 25° C. and 200 mm/min, preparing at least one hard material, said hard material being formed of at least one hollow member and at least one columnar hard material situated in the hollow member, disposing said damping material in space in the hollow member so that when vibration is applied to said damping material, vibration is reduced by the damping material.

* * * * *